United States Patent [19]

Lemkin et al.

[11] Patent Number: 4,562,865

[45] Date of Patent: Jan. 7, 1986

[54] TIMED WATER SHUT-OFF DEVICE

[75] Inventors: Jack L. Lemkin, Cincinnati; Eugene A. Zilber; Carl A. Peterson, both of Columbus, all of Ohio

[73] Assignee: O. M. Scott & Sons Company, Marysville, Ohio

[21] Appl. No.: 611,601

[22] Filed: May 18, 1984

[51] Int. Cl.⁴ .............................................. F10K 21/06
[52] U.S. Cl. .............................. 137/624.12; 137/624.21
[58] Field of Search ................... 137/624.11, 624.12, 137/624.21, 624.22

[56] References Cited

U.S. PATENT DOCUMENTS

| | | | |
|---|---|---|---|
| 1,300,982 | 4/1919 | Lodge | 137/624.11 X |
| 2,192,578 | 3/1940 | Michaels | 161/7 |
| 3,638,682 | 2/1972 | Heyer et al. | 137/624 |
| 4,130,135 | 12/1978 | Moore | 137/624 |
| 4,270,574 | 6/1981 | Graber | 137/624 |
| 4,280,530 | 7/1981 | Yi | 137/624 |
| 4,335,852 | 6/1982 | Chow | 239/68 |
| 4,351,360 | 9/1982 | Smyth | 137/624 |

Primary Examiner—Alan Cohan
Attorney, Agent, or Firm—James B. Raden; Harold J. Holt

[57] ABSTRACT

A timed water shut-off device of the type primarily useful for home gardens and lawns. The device comprises a water conduit containing a ball valve, a timer and timer housing rotatably mounted on the conduit and a plunger directly linking the timer and ball valve to permit flow of water for a preselected time.

2 Claims, 5 Drawing Figures

TIMED WATER SHUT-OFF DEVICE

This invention relates to a timed water shut-off device particularly of the type useful for controlling the flow of water for home gardens or lawns or for other irrigational purposes.

A variety of devices are known for the control of water flow for irrigational or industrial purposes. U.S. Pat. No. 2,192,578 to Michaels shows one such control device in which a spring motor is connected through a series of pin type linkages with a spring biased ball valve. U.S. Pat. Nos. 3,638,682 to Heyer et al and 4,270,574 to Graber disclose control devices using cylinder type valves in combination with a spring wound timer or clock mechanism. U.S. Pat. No. 4,130,135 to Moore shows a water wheel as the valve combined with an electrical or mechanical timing device. U.S. Pat. No. 4,280,530 uses a hinge type valve together with a drive means operated by water flow through the control device. U.S. Pat. No. 4,335,852 to Ho Chow uses an impeller to measure the volume of water and water flow is controlled through a cam engagement. U.S. Pat. No. 4,351,360 to Smyth discloses a clockwork timer which is sealed from the remainder of the control device by a diaphragm. None of these devices are as simple in design and operation as is desirable.

It is a primary object of the present invention to provide a simple, inexpensive but accurate device for the timed control of water flow, particularly useful in connection with the watering of home gardens and lawns.

The timed water shut-off device of the invention comprises a relatively few parts, namely a conduit containing a ball valve, a timer and timer housing rotatably coupled to the conduit and a plunger directly linking the timer with the ball valve to permit or shut-off water flow. More specifically, the timed water shut-off device of the invention comprises a water conduit containing a ball valve having a seated and unseated position and a timer enclosed within a timer housing, the timer and housing being rotatably mounted on one end of a shaft, the other end of the shaft being anchored within the conduit so as to rotably couple the timer and timer housing to the conduit, the timer and timer housing being adapted upon rotation in a first direction on the shaft to return the timer and housing to their original position in a preselected time. The timer housing has on its underside a cammed surface facing the conduit. The conduit has a plunger mounted therein, one end of which protrudes through an upper portion of the conduit and is in aligment with the cammed surface, the other end of the plunger being in alignment with the ball of the valve. The plunger is spring biased toward the cammed surface so that upon rotation of the timer and housing in a first direction, the plunger is adapted to engage and unseat the ball permitting passage of water and, upon return of the timer and the housing to their original position, to disengage from contact with the ball thereby allowing the ball to assume a seated position.

The invention will be better understood by reference to the accompanying drawing in which.

Figure 1:
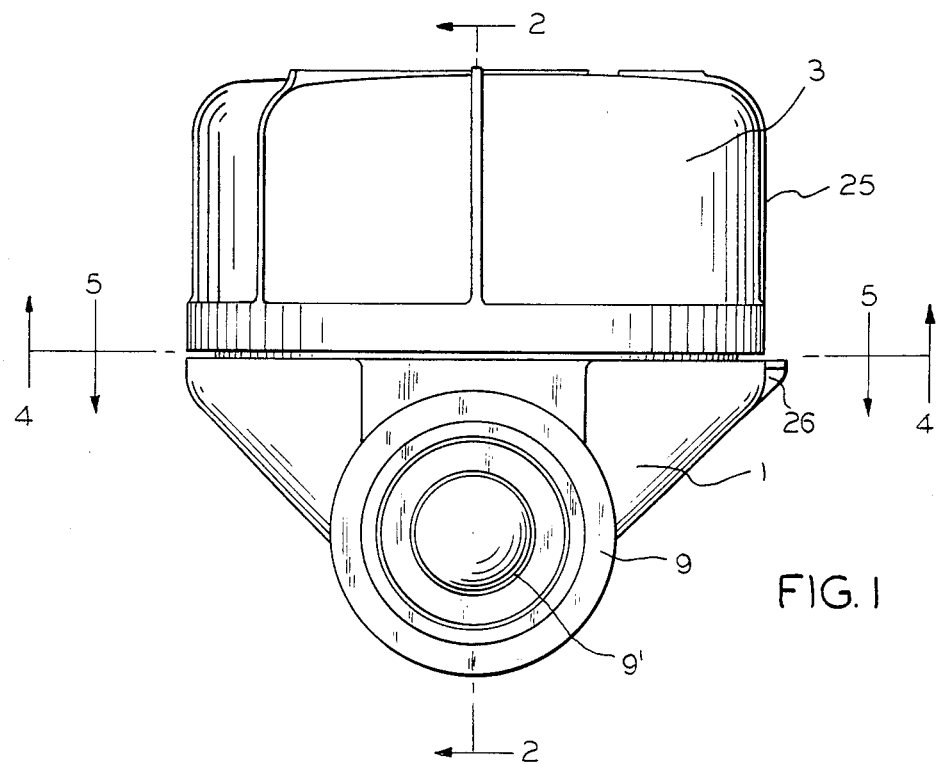
FIG. 1 is a side elevational view of one embodiment of a timed water shut-off device in accordance with the invention.

As shown in the drawing, the shut-off device comprises a conduit 1 and a timer 2 enclosed within a timer housing 3. The conduit and timer housing are conveniently made of a high impact plastic or other durable material. The timer may be of the well known type used for clock mechanisms comprising a series of gears (not shown) within gear enclosure 4 driven by a coil spring (not shown) within spring enclosure 5. Timer 2 and its housing 3 are rotatably mounted on one end of a shaft 6, the lower end of shaft 6 extending completely through and being anchored within conduit 1 by means of a pin 7 extending crosswise through the shaft. The shaft 6 is in power relationship with the timer 2 so that it may be rotatably driven by actuating the timer. Timer housing 3 is completed by a plastic disc 8 forming the underside of and completely enclosing timer 2. The timer and timer housing form a unit substantially sealed against entry of water into the timer.

Conduit 1 has a female coupling member 9 containing a water-strainer 9' at the water entrance end of the conduit for suitable attachment to a faucet, hose or other water source and a threaded male coupling member 10 at the water exit end of the conduit. Intermediate the coupling 9 and shaft 6 is a ball valve 10 comprising a ball 12, a ball seat 13 and a bushing 14 to prevent escape of the ball from the conduit.

A plunger 15 is mounted within a boss 16 on the upper portion of conduit 1. The plunger has a rounded head 17 at its lower end for sliding engagement with the ball 12 with which the plunger is in alignment. The upper portion of plunger 15 is encased in a plastic or elastomeric dome 20 which serves to contain the plunger and a spring 21 for biasing the plunger toward the plastic disc 8 on the underside of the timer housing.

Figure 4:
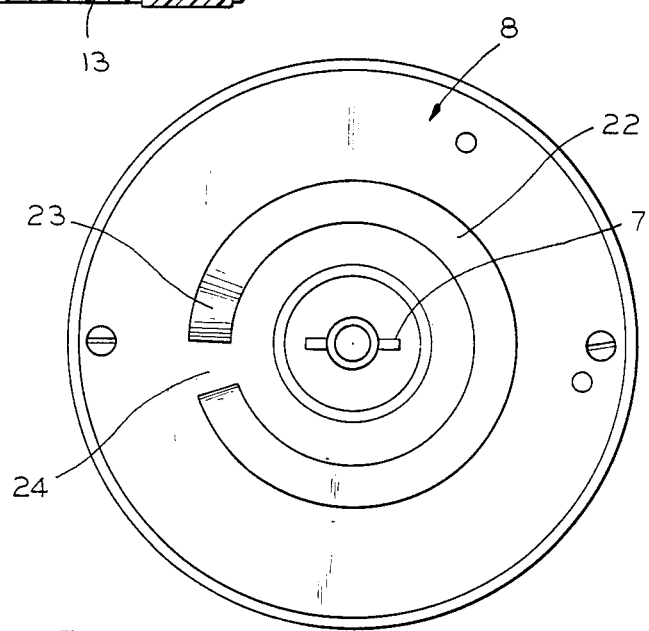
FIG. 4 is a view along the lines 4-4 of FIG. 1 showing the underside of the timer housing.
Figure 5:
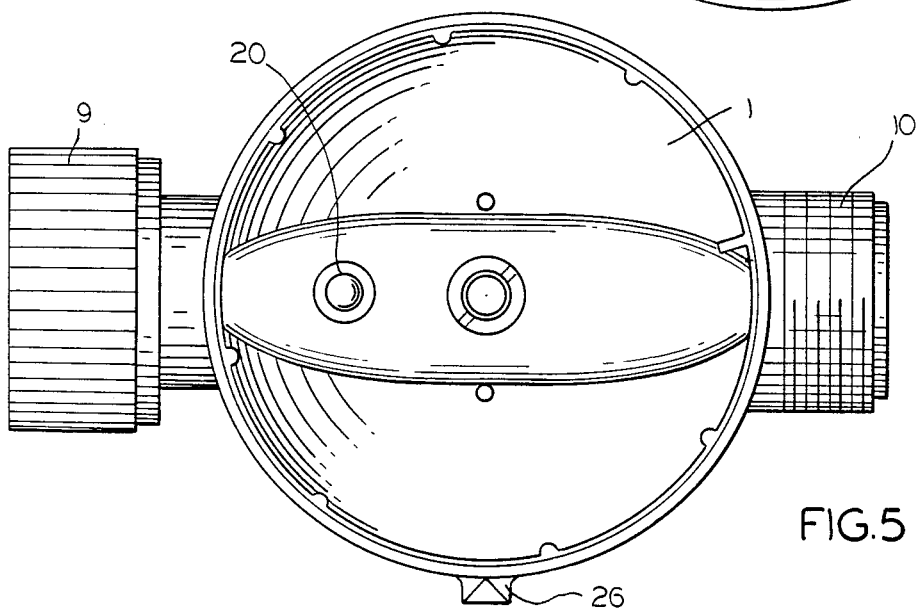
FIG. 5 is a view along the lines 5—5 of FIG. 1 showing the top portion of the conduit.

As can be seen from FIG. 4, the underside of disc 8 contains a cammed surface 22, projecting from the surface of disc 8, which forms a slightly less than 360° annulus. The cammed surface 22 is angled or inclined at 23 so as to form a smooth ramp from the surface of disc 8 to the raised surface of annulus 22, leaving a slot portion 24 which is level with the remaining surface of the disc.

Figure 2:
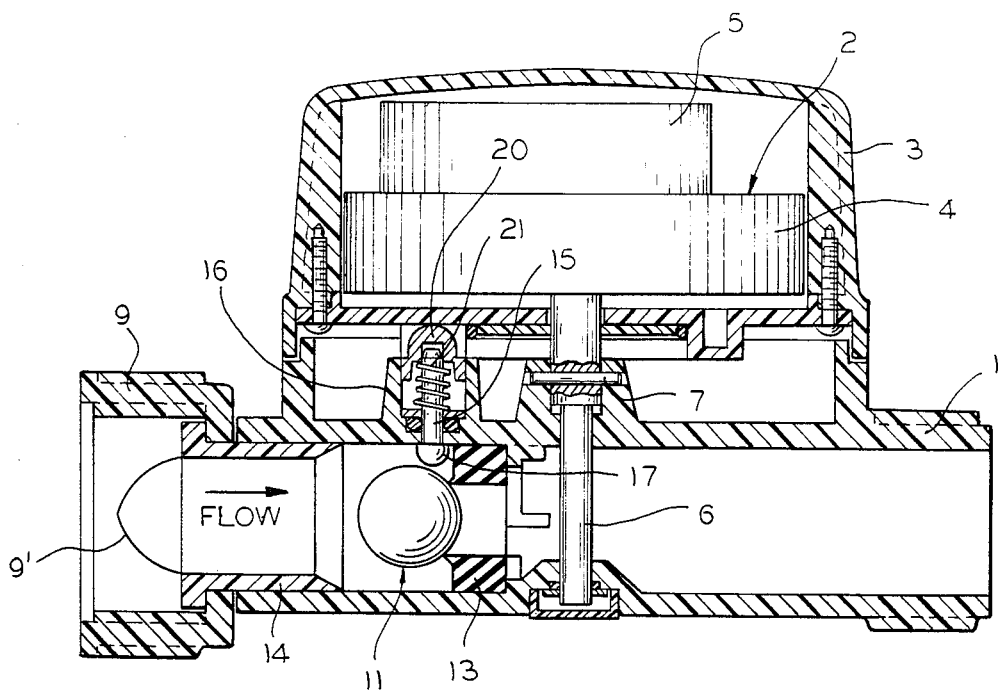
FIG. 2 is a crossectional view taken along the lines 2—2 of FIG. 1 showing the shut-off device in closed position.
Figure 3:
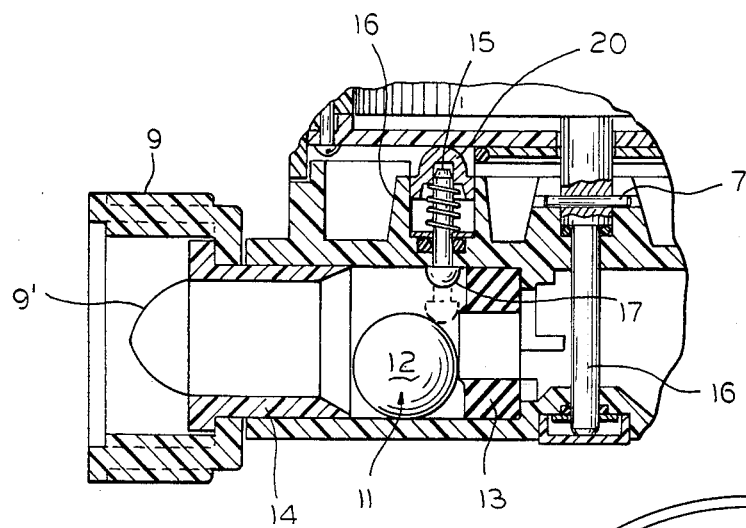
FIG. 3 is a fragmentary crossectional view similar to FIG. 2 showing the shut-off device in open position.

In operation, when the timer is in rest position, that is, it has not been activated, the plunger 15 is aligned with the slot portion 24 and is in retracted position as shown in FIG. 2. This permits free movement of the ball 12. Water flow through the conduit will seal ball 12 against valve seat 13, as also shown in FIG. 2, and prevent further flow of water. This off position is identified by alignment of a ridge 25 on the timer housing with a projecting pointer 26 on the conduit as shown in FIG. 1. Rotation of the timer housing in a clockwise direction will both actuate the timer and depress the plunger as it rides up the ramp 23 of the cammed surface. As shown in phantom outline in FIG. 3, the head 17 of the depressed plunger will prevent seating of the ball 12 against valve seat 13 and permit passage of water. The actuated timer will then return the timer housing to the original off position in a preselected time by rotation on shaft 6, allowing the ball to again assume a seated position. The timer housing may be suitably marked in time increments, e.g. from ½ to 2 hours or more, so as to permit setting the timer to a preselected time period.

What is claimed is:

1. A timed water shut-off device comprising a conduit for the passage of water therethrough, said conduit containing a valve therein for the control of the passage of water through said conduit, said valve containing a ball having a seated and an unseated position within said conduit, a timer enclosed within a timer housing rotatably mounted on one end of a shaft, the other end of said shaft being anchored within said conduit so as to rotatably couple said timer and timer housing directly to said conduit, said timer and timer housing being adapted upon rotation in a first direction on said shaft to return said timer and housing to their original position in a preselected time, said timer and timer housing together forming a single unit substantially sealed against entry of water into said timer, said timer housing having on its underside a cammed surface facing said conduit, said conduit having a plunger mounted therein, one end of which protrudes through an upper portion of the conduit and is in alignment with the cammed surface on the underside of the timer housing, the other end of the plunger being in alignment with the ball of the valve, said plunger being spring biased toward said cammed surface so that upon rotation of said timer and housing in a first direction, the plunger is adapted to engage and unseat said ball permitting passage of water and, upon return of said timer and housing to their original position, to disengage from contact with said ball thereby allowing the ball to assume a seated position.

2. The timed water shut-off device of claim 1 in which the cammed surface comprises a smooth ramp leading from the surface of the underside of the timer housing to a raised incomplete annulus.

* * * * *